(12) United States Patent
Chen et al.

(10) Patent No.: US 10,826,219 B2
(45) Date of Patent: Nov. 3, 2020

(54) INSULATED ELECTRICAL CONNECTOR FORMED BY ONE-TIME INJECTION MOLDING

(71) Applicant: Xiamen GHGM Industrial Trade Co., Ltd., Xiamen (CN)

(72) Inventors: Bingshui Chen, Xiamen (CN); Baohua Huang, Xiamen (CN); Zhihuan Li, Xiamen (CN); Yonglong Li, Xiamen (CN)

(73) Assignee: XIAMEN GHGM INDUSTRIAL TRADE CO., LTD., Xiamen (CN)

( * ) Notice: Subject to any disclaimer, the term of this patent is extended or adjusted under 35 U.S.C. 154(b) by 0 days.

(21) Appl. No.: 16/383,962

(22) Filed: Apr. 15, 2019

(65) Prior Publication Data

US 2020/0287313 A1    Sep. 10, 2020

(30) Foreign Application Priority Data

Mar. 7, 2019    (CN) .................... 2019 2 0290825 U
Mar. 7, 2019    (CN) .................... 2019 2 0291001 U

(51) Int. Cl.
| | | |
|---|---|---|
| H01R 11/22 | (2006.01) | |
| H01R 13/405 | (2006.01) | |
| H01R 13/631 | (2006.01) | |
| H01R 4/02 | (2006.01) | |
| H01R 13/11 | (2006.01) | |
| H01R 43/16 | (2006.01) | |

(52) U.S. Cl.
CPC .......... *H01R 13/405* (2013.01); *H01R 4/029* (2013.01); *H01R 13/11* (2013.01); *H01R 13/631* (2013.01); *H01R 43/16* (2013.01)

(58) Field of Classification Search
CPC .................................................. H01R 13/2442
USPC ......................................... 439/816, 856, 857
See application file for complete search history.

(56) References Cited

U.S. PATENT DOCUMENTS

| | | | | |
|---|---|---|---|---|
| 5,152,702 A | * | 10/1992 | Pilny .................... | H05K 3/0094 228/216 |
| 5,188,535 A | * | 2/1993 | Bertho .................. | H01R 12/57 439/83 |
| 7,527,529 B2 | * | 5/2009 | Ho ......................... | H01R 12/57 439/660 |

* cited by examiner

*Primary Examiner* — Phuong K Dinh
(74) *Attorney, Agent, or Firm* — Muncy, Geissler, Olds & Lowe, P.C.

(57) ABSTRACT

An insulated electrical connector formed by one-time injection molding is disclosed. A base of each metal female terminal has two edges extending upward and inclining relative to each other to form elastic clamping pieces, and an edge extending outwards to form a weld leg. An insulated rubber core is formed on the metal female terminals by one-time injection molding. The bases are embedded in the insulated rubber core. The elastic clamping pieces are received in cavities of the insulated rubber core. Insertion holes corresponding to the elastic clamping pieces are formed in bottoms of the cavities. Conical guide-in faces are formed at bottoms of the insertion holes. The weld legs stretch out of the insulated rubber core. The insulated electrical connector is convenient to install and realizes stable electric connection.

9 Claims, 18 Drawing Sheets

INSULATED ELECTRICAL CONNECTOR FORMED BY ONE-TIME INJECTION MOLDING

BACKGROUND OF THE INVENTION

Technical Field

The invention relates to the technical field of electrical connectors, in particular to an insulated electrical connector formed by one-time injection molding.

Description of Related Art

In the prior art, LED bulbs are connected to power supplies through a wire in such a manner that the two ends of the wire are separately welded to a light source board and a driver board, so that power is supplied to an LED chip on the light source board. Such electric connection manner is complex in operation, results in high assembling costs of the LED bulbs and cannot be assembled automatically.

For this reason, various direct-insertion connectors have been developed by those skilled in this field to replace existing wires to realize connection by directly inserting male terminals into female terminals, thus, simplifying the electric connection structure of the light source board of the LED bulbs and the driver board, achieving connection more conveniently, making assembling and machining easier, and realizing automatic production.

However, existing direct-insertion connectors are complex in structure and still have installation and connection defects which result in frequent short circuits and cold solder joints, and consequentially, normal work of the LED bulbs is affected. The inventor puts forwards this application based on development and improvements on existing direct-insertion connectors.

BRIEF SUMMARY OF THE INVENTION

The objective of the invention is to provide an insulated electrical connector which is formed by one-time injection molding and is simple in structure, convenient to assemble and capable of realizing stable electric connection.

The technical solution adopted by the invention to fulfill the above objective is as follows:

An insulated electrical connector formed by one-time injection molding comprises an insulated rubber core and metal female terminals. Two edges of a base of each metal female terminal extend upwards and incline relative to each other to form a pair of electric clamping pieces allowing a male terminal to be inserted therebetween to realize electric connection, and another edge of the base extends outwards to form a weld leg. The insulated rubber core is formed on the metal female terminals by one-time injection molding. The bases of the metal female terminals are embedded in the insulated rubber core. The pair of elastic clamping pieces of each metal female terminal is received in a cavity formed in the insulated rubber core. Through insertion holes corresponding to the elastic clamping pieces of the metal female terminals and allowing the male terminals to penetrate through are formed in bottoms of the cavities. Conical guide-in faces are formed at bottoms of the insertion holes. The weld legs stretch out of the insulated rubber core.

An insulated electrical connector formed by one-time injection molding comprises an insulated rubber core and metal female terminals. Each metal female terminal is provided with a base, wherein the base is in an n shape when looked at from above, two horizontal edges of the base extend upwards and incline relative to each other to form a pair of elastic clamping pieces allowing a male terminal to be inserted therebetween to realize electric connection, two ends of a vertical edge of the base extend upwards and are bent inwards to form pressing blocks located on the elastic clamping pieces, and the vertical edge of the base extends outwards to form a weld leg. The insulated rubber core is formed on the metal female terminals by one-time injection molding. The bases of the metal female terminals are embedded in the insulated rubber core. Cavities are formed in the insulated rubber core. The elastic clamping pieces of the metal female terminals stretch out of bottoms of the cavities so as to be received in the cavities. Through insertion holes corresponding to the elastic clamping pieces of the metal female terminals and allowing the male terminals to penetrate through are formed in the bottoms of the cavities. Conical guide-in faces are formed at bottoms of the insertion holes. The weld legs stretch out of the insulated rubber core.

An insulated electrical connector formed by one-time injection molding comprises an insulated rubber core and metal female terminals. Each metal female terminal is provided with a horizontal base, wherein two opposite edges of the base extend upwards and incline relative to each other to form two enclosure parts and a pair of elastic clamping pieces allowing a male terminal to be inserted therebetween to realize electric connection, the base is formed with an insertion groove which corresponds to the elastic clamping pieces and allows the male terminal to penetrate through to be electrically connected with the elastic clamping pieces, and another edge of the base extends outwards to form a weld leg. The insulated rubber core is formed on the metal female terminals by one-time injection molding. The bases of the metal female terminals are embedded in the insulated rubber core. The two enclosure parts of each metal female terminal enclose two side faces of the insulated rubber core from the outside. The pair of elastic clamping pieces of each metal female terminal is received in a cavity formed in the insulated rubber core. Through insertion holes corresponding to the insertion grooves and the elastic clamping pieces of the metal female terminals and allowing the male terminals to penetrate through are formed in bottoms of the cavities. Conical guide-in faces are formed at bottoms of the insertion holes. The weld legs stretch out of the insulated rubber core.

By adoption of the above technical solution, the electrical connector has the following beneficial effects: the insulated rubber core is formed on the metal female terminals by one-time injection molding, the bases of the metal female terminals are embedded in the insulated rubber core and are connected with the outside (such as a light source board) by means of the weld legs, so that the bases of the metal female terminals are firmly installed and are prevented from getting loose, the metal female terminals are prevented from moving during injection molding, therefore, the elastic clamping pieces are accurately and firmly installed, and the qualification rate and the stability of electric connection are ensured.

The invention is further explained below in combination with accompanying drawings and embodiments.

Figure 1:
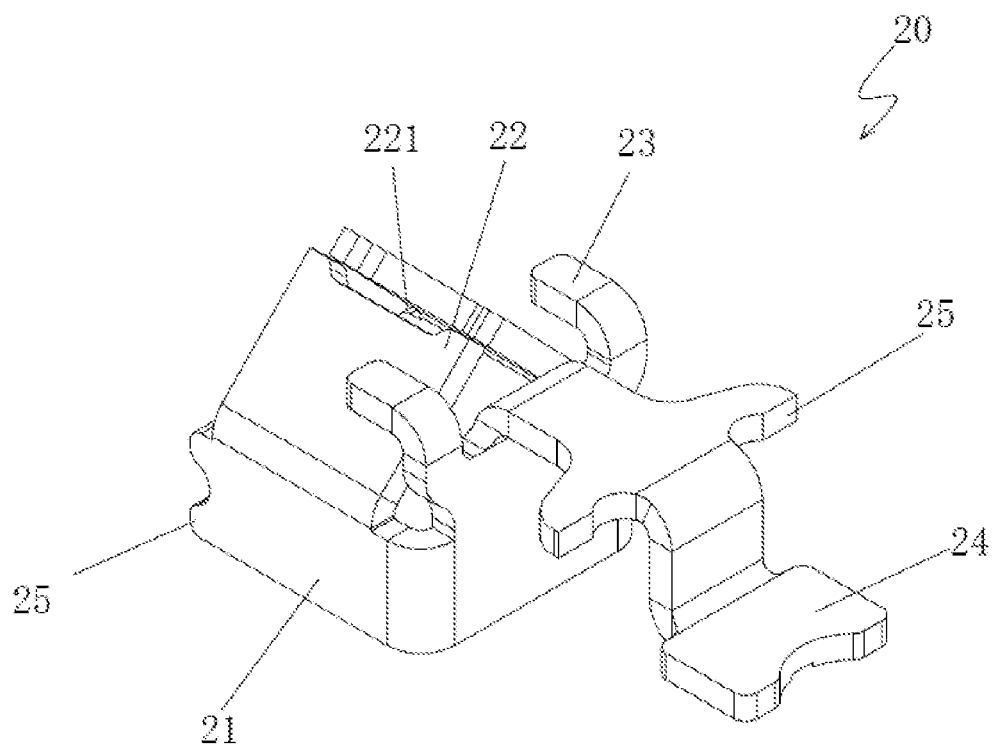
FIG. 1, FIG. 2 and FIG. 3 are a first perspective view, a second perspective view and a top view of a metal female terminal after bending in embodiment 1.
Figure 2:
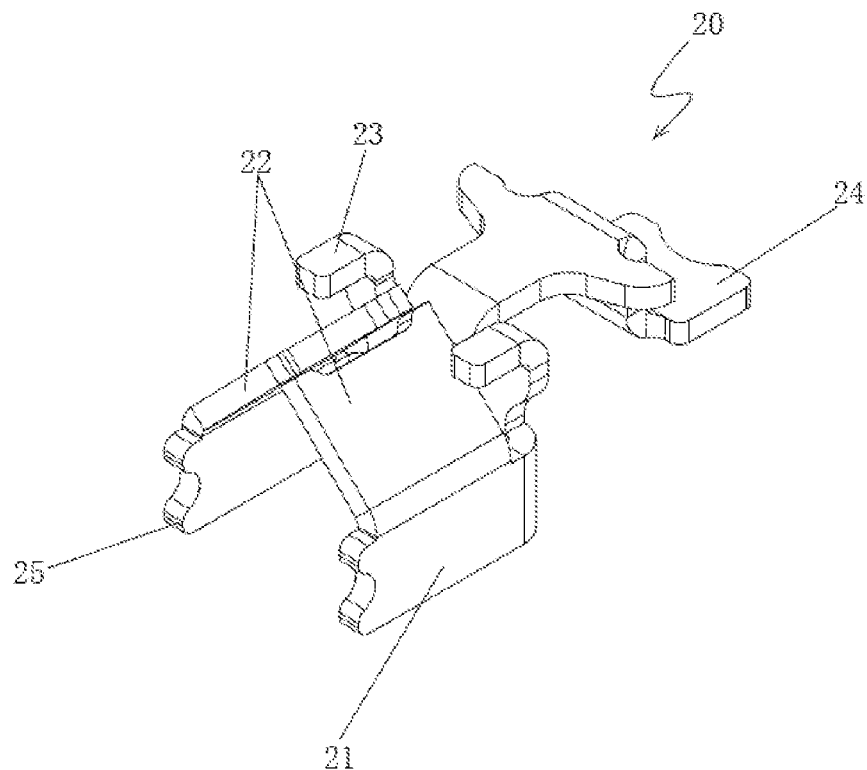
Figure 3:
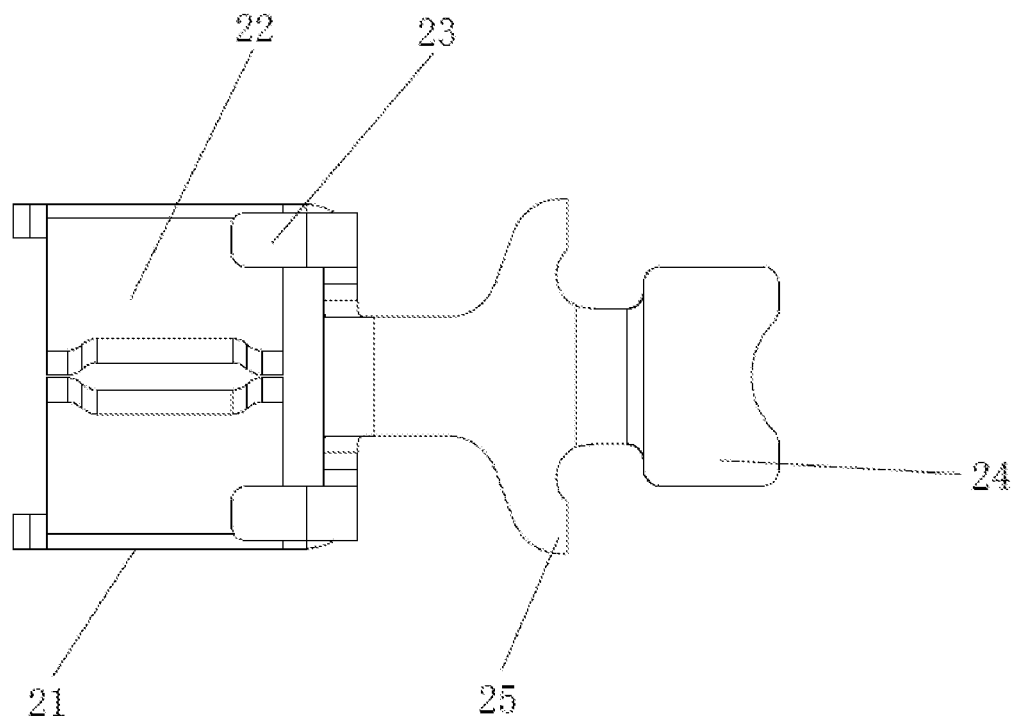
Figure 4:
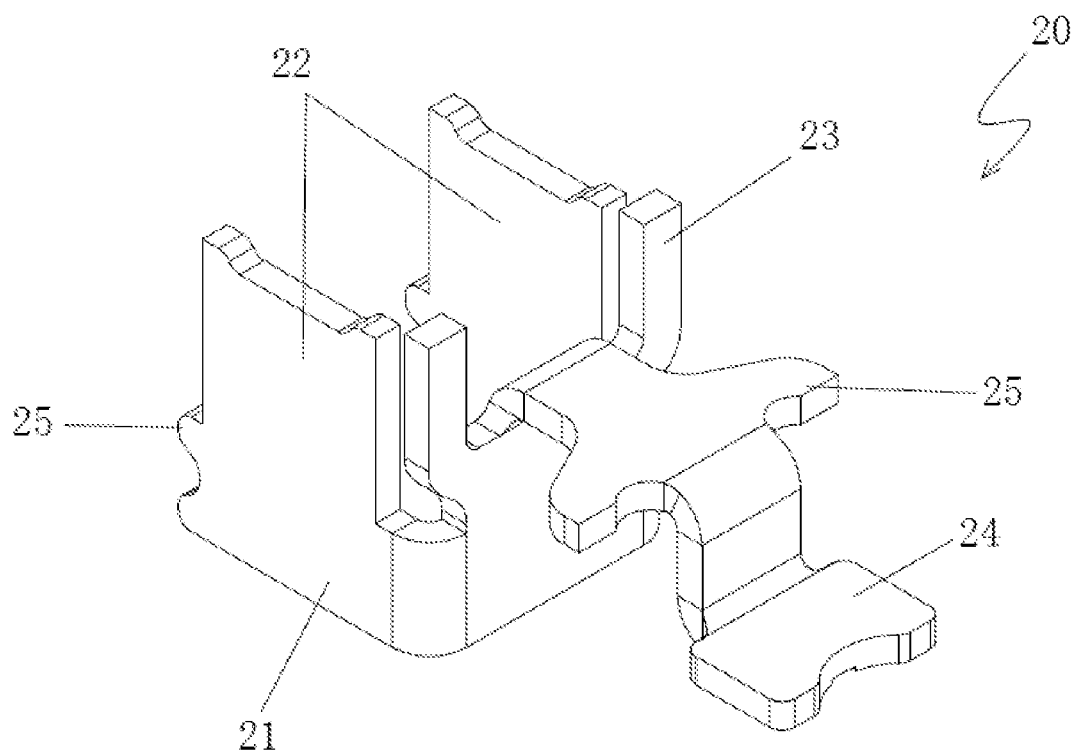
FIG. 4, FIG. 5 and FIG. 6 are a first perspective view, a second perspective view and a top view of the metal female terminal before bending in embodiment 1.
Figure 5:
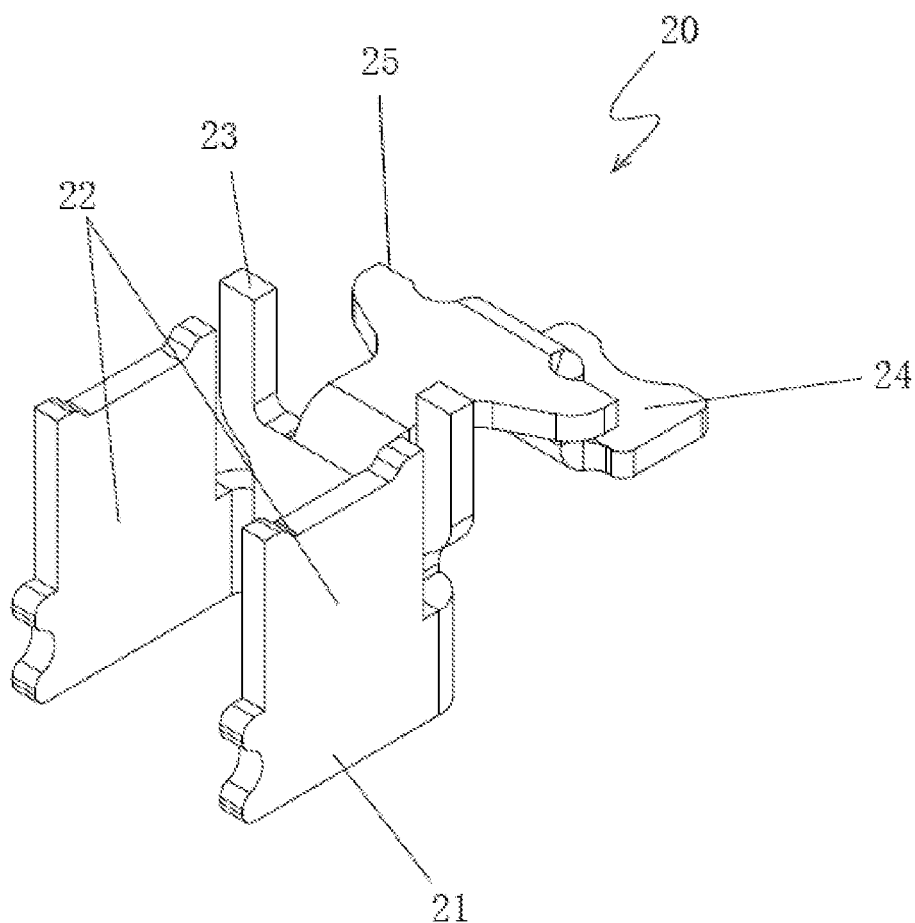
Figure 6:
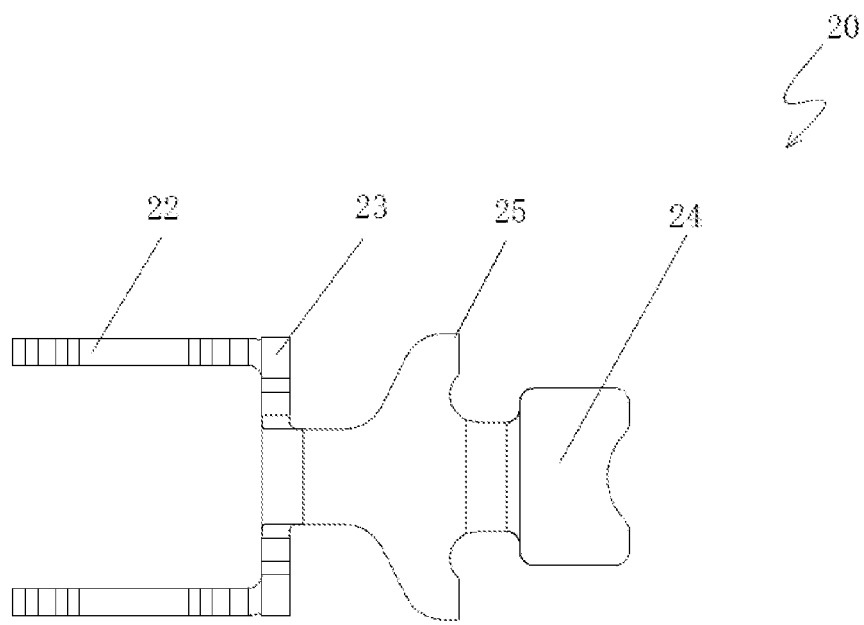
Figure 7:
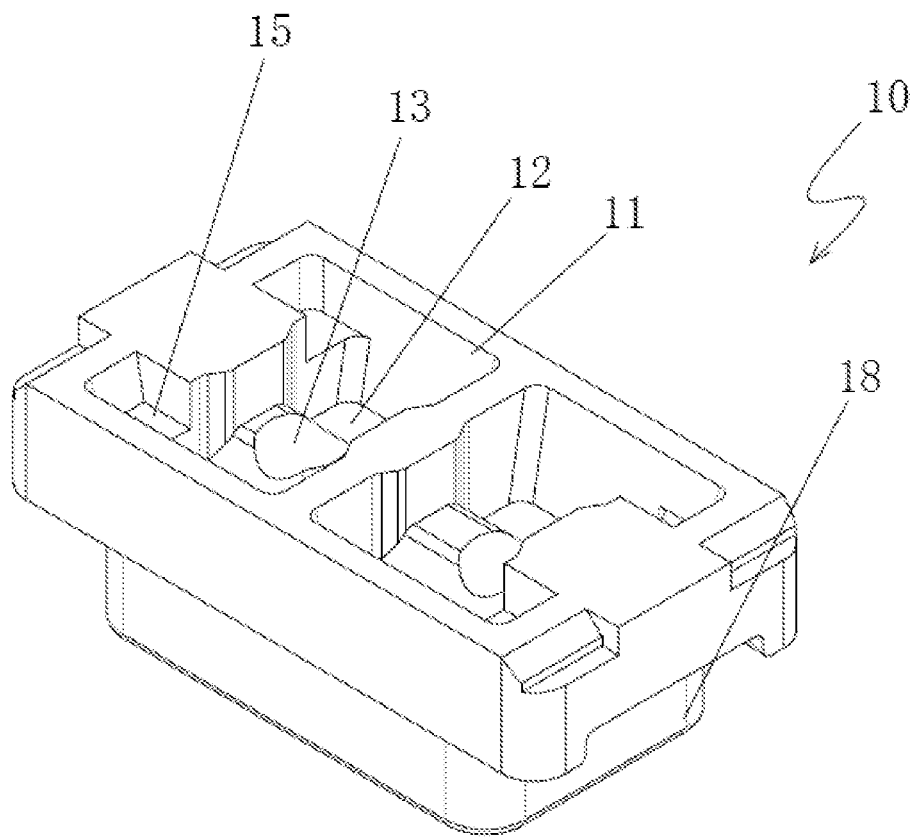
FIG. 7 and FIG. 8 are a top view and a bottom view of an insulated rubber core in embodiment 1.
Figure 8:
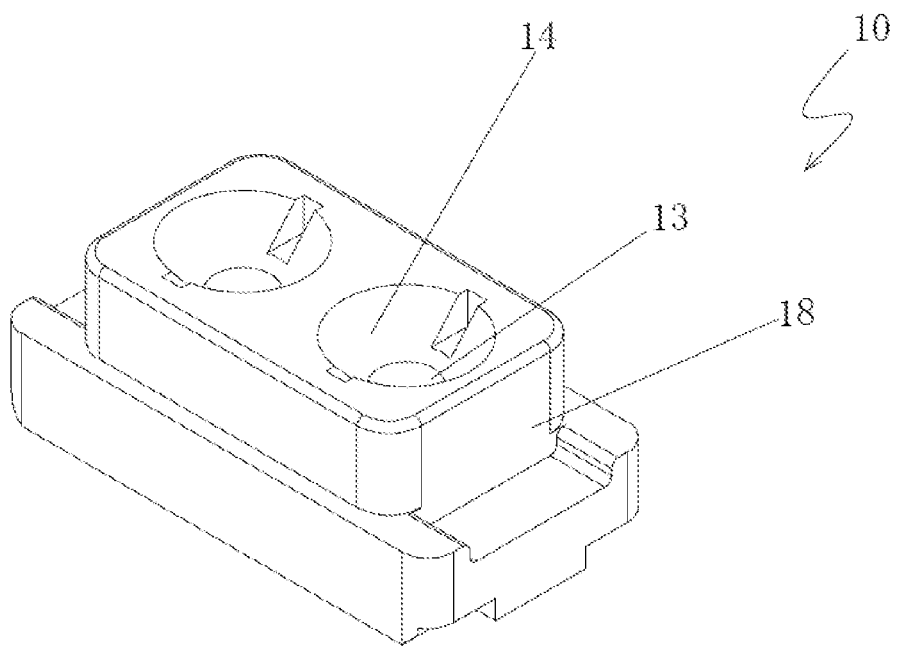
Figure 9:
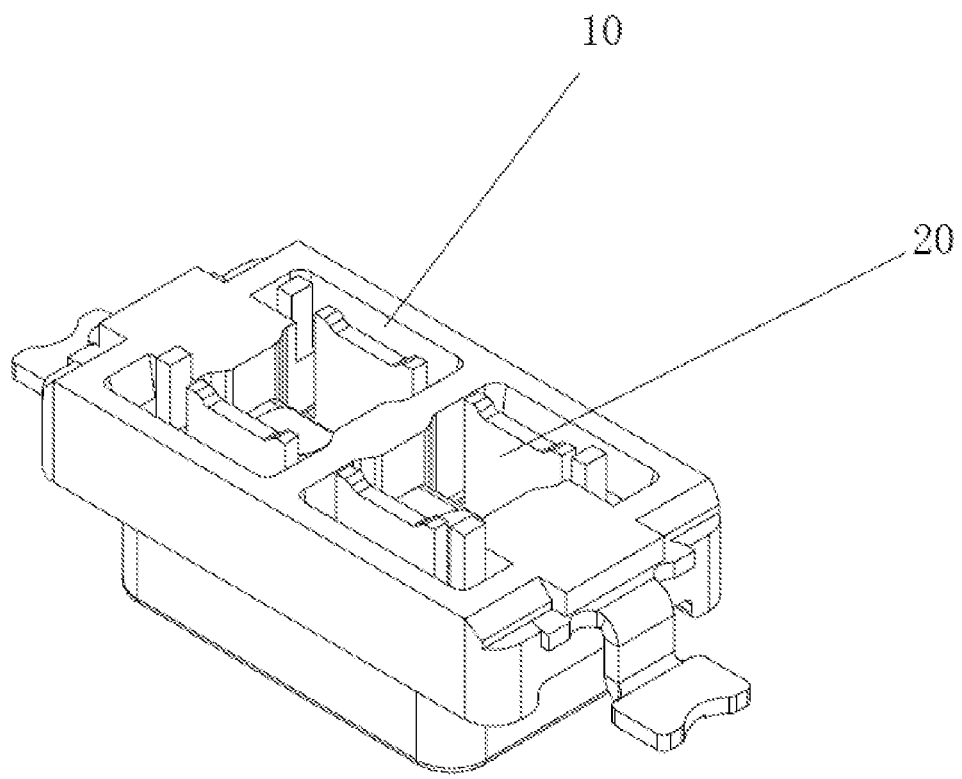
FIG. 9 is a view of a semi-finished connector formed by injection molding (before the metal female terminals are bent) in embodiment 1.
Figure 10:
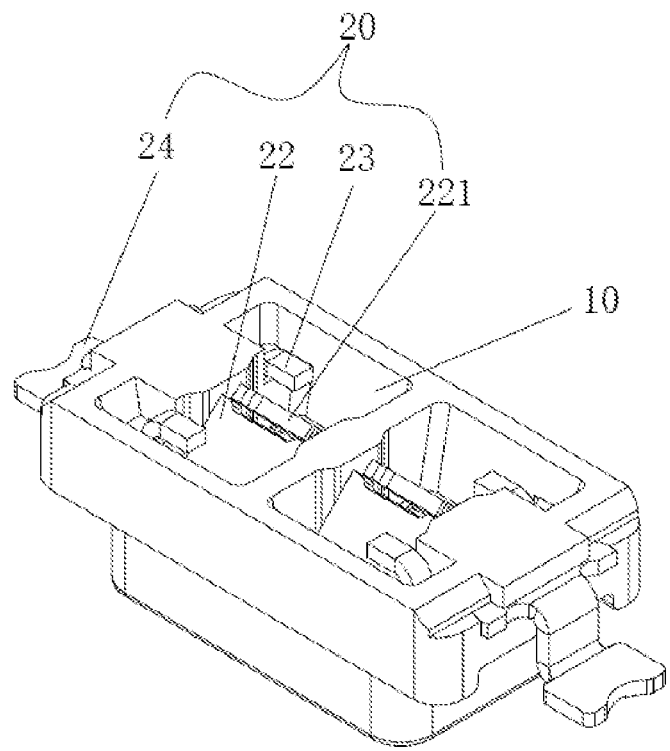
FIG. 10 is a top view of a finished connector (after the metal female terminals are bent) in embodiment 1.
Figure 11:
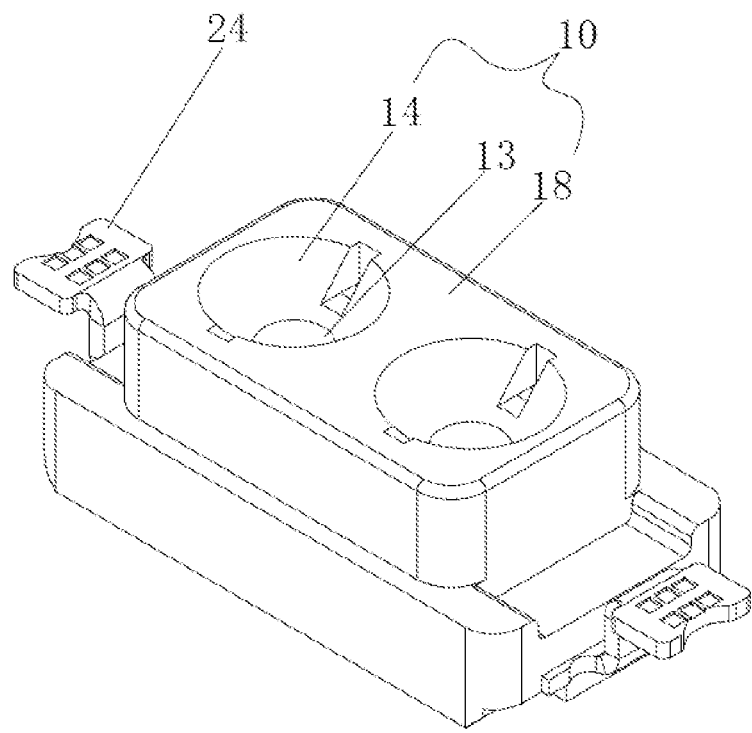
FIG. 11 is a bottom view of the finished connector in embodiment 1.
Figure 12:
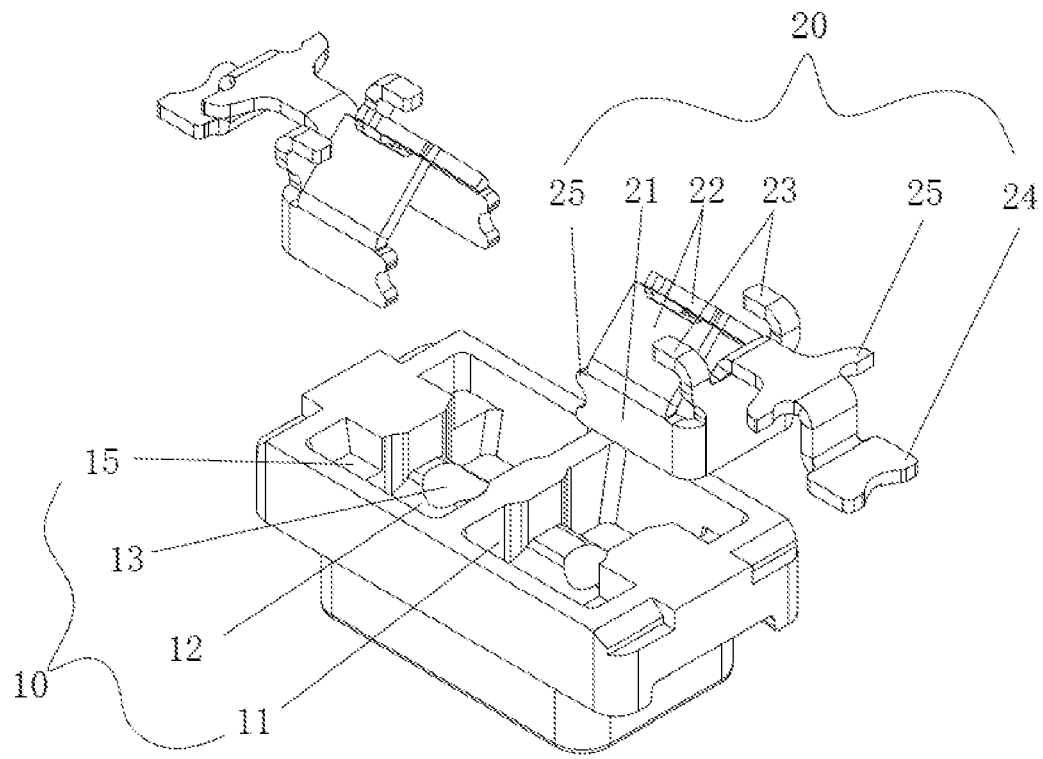
FIG. 12 is a disassembled view of the metal female terminals and the insulated rubber core in embodiment 1.

REFERENCE SIGNS 10, insulated rubber core; 11, cavity; 111, cavity wall; 12, convex face; 121, side face; 122, top face; 13, insertion hole; 14, conical guide-in face; 15, step; 16, partition wall; 17, convex wall; 18, boss; 20, metal female terminal; 21, base; 211, insertion groove; 22, elastic clamping piece; 221, clamping opening; 23, pressing block; 24, weld leg; 25, positioning hook; 26, positioning hole; 27, enclosure part.

DETAILED DESCRIPTION OF THE INVENTION

As shown in FIGS. 1-36, the invention discloses an insulated electrical connector formed by one-time injection molding. The insulated electrical connector formed by one-time injection molding comprises an insulated rubber core 10 and metal female terminals 20. Two edges of a base of each metal female terminal 20 extend upwards and incline relative to each other to form a pair of electric clamping pieces 22 allowing a male terminal to be inserted therebetween to realize electric connection, and another edge of the base extends outwards to form a weld leg 24. The insulated rubber core 10 is formed on the metal female terminals 20 by one-time injection molding. The bases of the metal female terminals 20 are embedded in the insulated rubber core 10. The pair of elastic clamping pieces 22 of each metal female terminal 20 is received in a cavity 11 formed in the insulated rubber core 10. Through insertion holes 13 corresponding to the elastic clamping pieces 22 of the metal female terminals 20 and allowing the male terminals to penetrate through are formed in bottoms of the cavities 11. Conical guide-in faces 14 are formed at bottoms of the insertion holes 13. The weld legs 24 stretch out of the insulated rubber core 10 to be electrically connected with the outside (such as a light source board). In the invention, the bases of the metal female terminals 20 are firmly installed and are prevented from getting loose, and the metal female terminals 20 are prevented from moving during injection molding, so that the elastic clamping pieces 22 are accurately and firmly installed, and the qualification rate and the stability of electric connection are ensured.

As shown in FIGS. 1-24, the electrical connector in embodiment 1 and embodiment 2 of the invention comprises an insulated rubber core 10 and metal female terminals 20.

Each metal female terminal 20 is provided with a base 21, wherein the base 21 is in an n shape when looked at from above, two horizontal edges of the base 21 extend upwards and incline relative to each other to form a pair of elastic clamping pieces 22 allowing a male terminal to be inserted therebetween to realize electric connection, two ends of a vertical edge of the base 21 extend upwards and are bent inwards to form pressing blocks 23, the pressing blocks 23 are located on the elastic clamping pieces 22 and are used for preventing the elastic clamping pieces 22 from turning upwards when pushed by an insertion force from the male terminal, and the vertical edge of the base 21 extends outwards to form a weld leg 24. In embodiment 1, the vertical edge of the base 21 extends upward and outwards and is then bent in a Z shape to form the weld leg 24. Or, in embodiment 2, the vertical edge of the base 21 extends downwards and outwards to form the weld leg 24.

The insulated rubber core 10 is directly formed on the metal female terminals 20 by one-time injection molding. The bases 21 of the metal female terminals 20 are embedded into the insulated rubber core 10. Cavities 11 used for receiving the elastic clamping pieces 22 of the metal female terminals 20 are formed in the insulated rubber core 10. The elastic clamping pieces 22 of the metal female terminals 20 stretch out of bottoms of the cavities 11. Through insertion holes 13 corresponding to the elastic pieces 22 of the metal female terminals 20 and allowing the male terminals to penetrate through to be matched with the elastic clamping pieces 22 to realize electric connection are formed in the bottoms of the cavities 11. Conical guide-in faces 14 through which the male terminals can smoothly penetrate through the insertion holes 13 are formed at bottoms of the insertion holes 13. The weld legs 24 stretch out of the insulated rubber core 10 so as to be welded on a light source board to realize electric connection.

The optimal design of the invention lies in that corresponding to the elastic clamping pieces 22 of the metal female terminals 20, the bottoms of the cavities 11 of the insulated rubber core 10 are arched to form convex faces 12 which are close to bottom faces of the elastic clamping pieces 22. In embodiment 2, each convex face 12 has two upward-tilting side faces 121 and a smooth-transition middle top face 122. Bottom faces of two edges of each pair of elastic clamping pieces 22 are close to the two upward-tilting side faces 121 of the corresponding convex face 12. A clamping opening 221 of each pair of elastic clamping pieces 22 directly faces the smooth-transition middle top face 122 of the convex face 12. The insertion holes 13 allowing the male terminals to penetrate through are located in the smooth-transition middle top faces of the convex faces 12.

According to the electrical connector, the insulated rubber core 10 is formed on the metal female terminals 20 by one-time injection molding, and the bases 21 of the metal female terminals 20 are embedded in the insulated rubber core 10 and are connected with the outside (such as a light source board) by means of the weld legs 24, so that the bases 21 of the metal female terminals 20 are firmly installed and are prevented from getting loose. In addition, upper portions of the elastic clamping pieces 22 of the metal female terminals 20 are limited by the pressing blocks 23, thereby being prevented from turning upwards; and the elastic clamping pieces 22 stretch out of the bottoms of the cavities 11 of the insulated rubber core 10 to be supported, so that accurate positioning and firm installation are realized, and the stability of electric connection is ensured.

In embodiment 1 of the invention, the insulated rubber core 10 is shaped like the Chinese character 'ri' when looked at from above, is formed on the two metal female terminals 20 by one-time injection molding and is provided with two deep square cavities 11. Each cavity 11 receives the elastic clamping pieces 22 of one metal female terminal 20. The weld legs 24 of the two metal female terminals 20 stretch out from two sides of the insulated rubber core 10. In order to support and position the pressing blocks 23, steps are formed at positions, corresponding to the pressing blocks 23, of the cavities 11 of the insulated rubber core 10, and the pressing blocks 23 stretch out via the steps 15 so as to be supported and fixed on the steps 15.

In embodiment 2 of the invention, the insulated rubber core 10 is formed on the two metal female terminals 20 by one-time injection molding and is provided with two shallow square cavities 11. A partition wall 16 is formed between the two cavities 11 to prevent creepage, and convex walls 17 are formed on two sides of the two cavities 11. Each cavity 11 receives the elastic clamping pieces 22 of one metal female terminal 20. The pressing blocks 23 of the metal female terminals 20 stretch out via the convex walls 17 so as to be supported and fixed on the convex walls 17. The weld legs 24 of the two metal female terminals 20 stretch out from two sides of the insulated rubber core 10.

Figure 13:
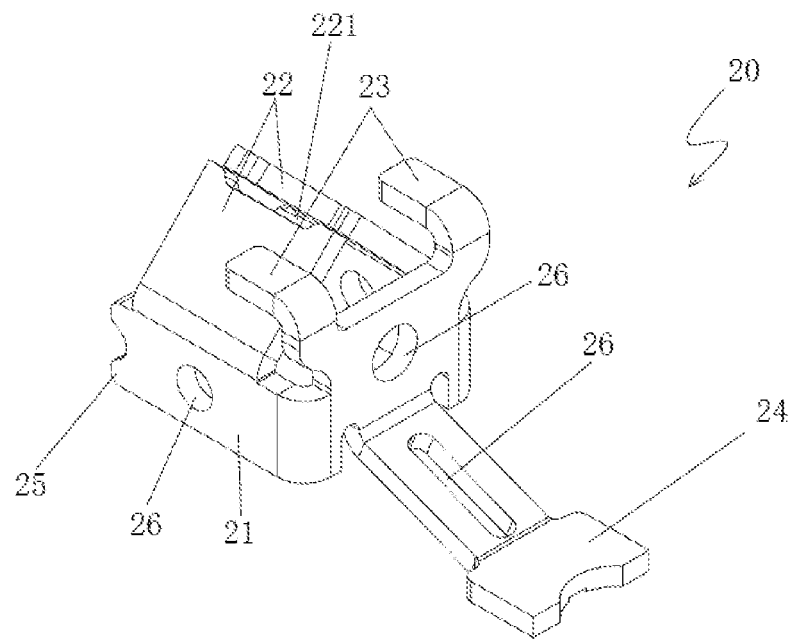
FIG. 13, FIG. 14 and FIG. 15 is a first perspective view, a second perspective view and a top view of a metal female terminal after bending in embodiment 2.
Figure 14:
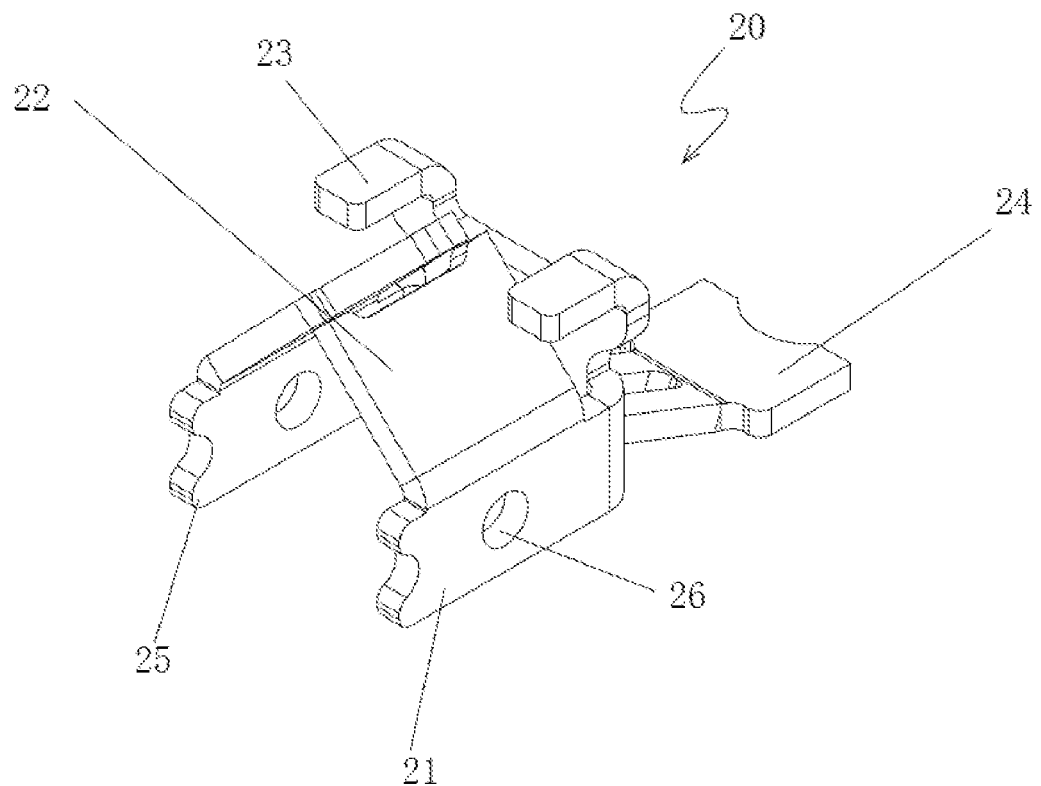
Figure 15:
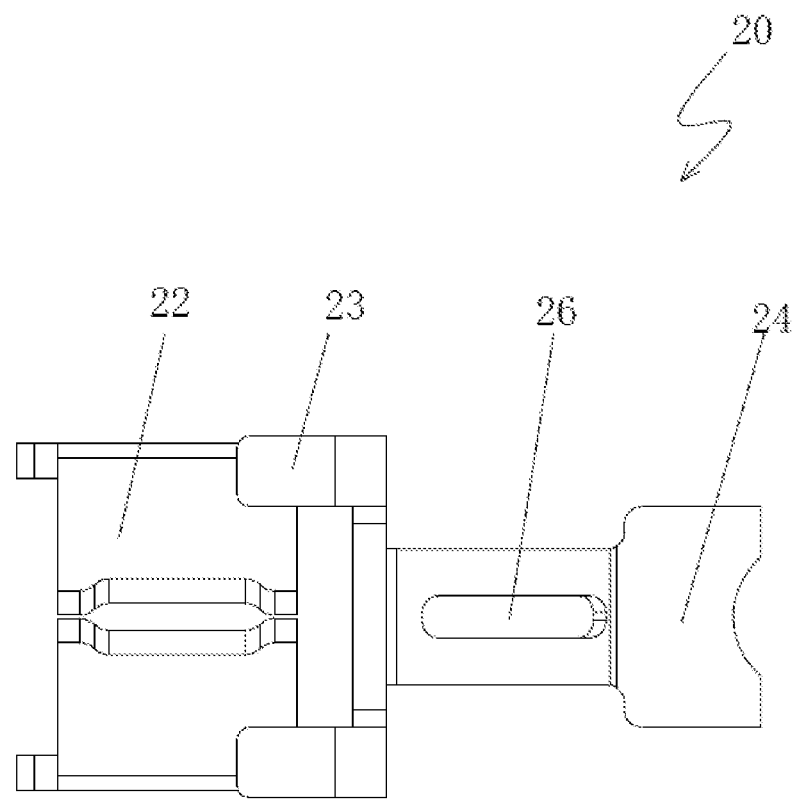
Figure 16:
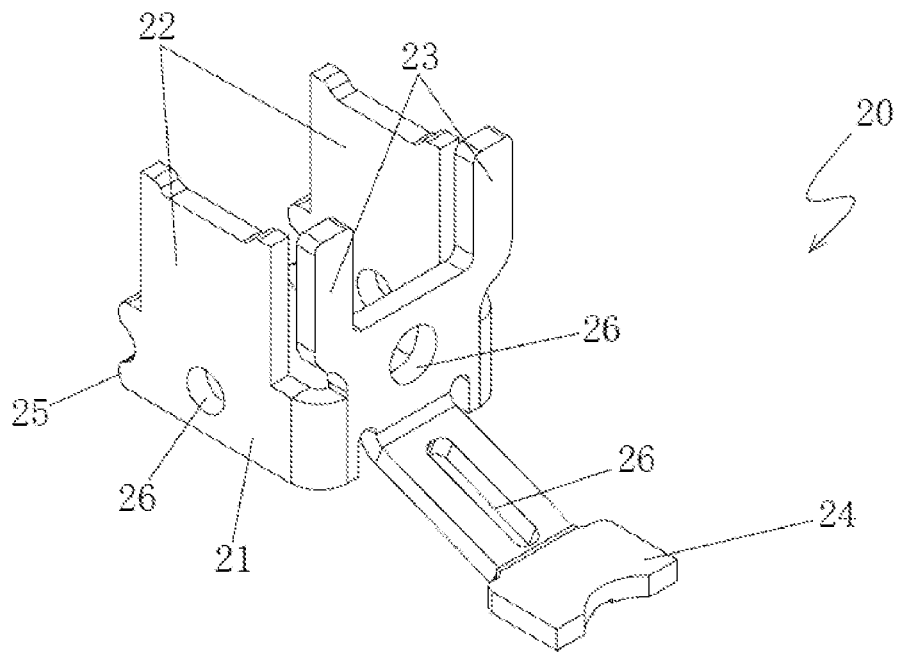
FIG. 16, FIG. 17 and FIG. 18 are a first perspective view, a second perspective view and a top view of the metal female terminal before bending in embodiment 2.
Figure 17:
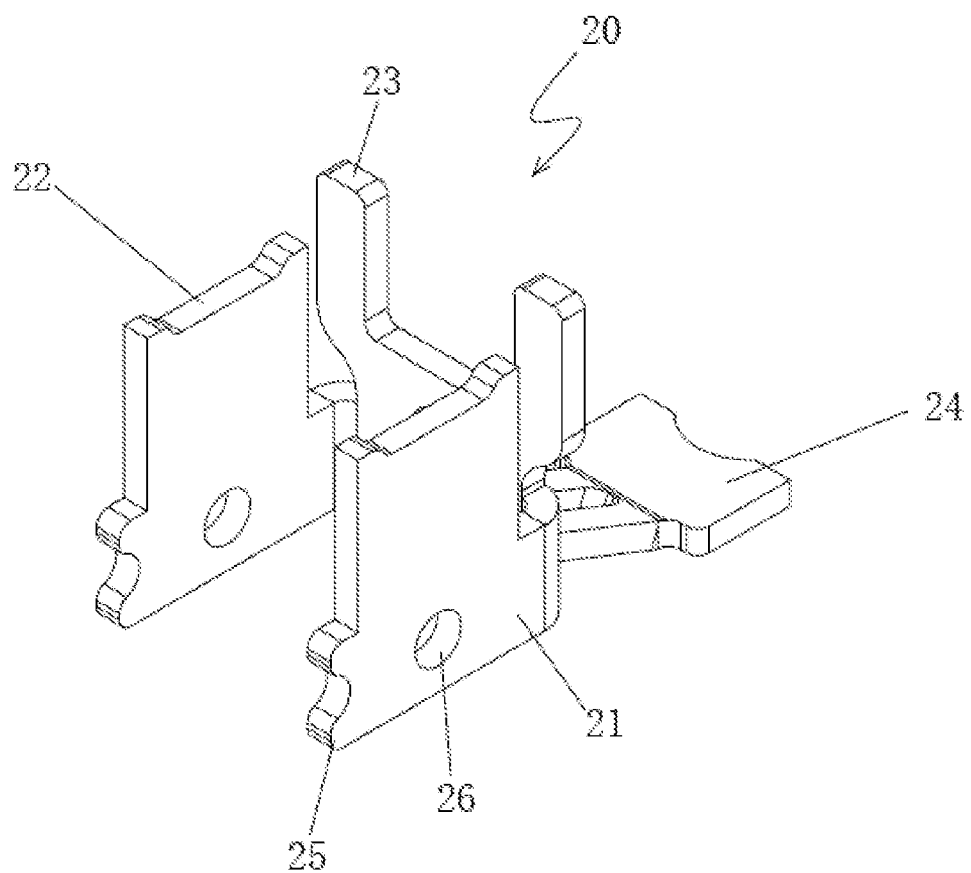
Figure 18:
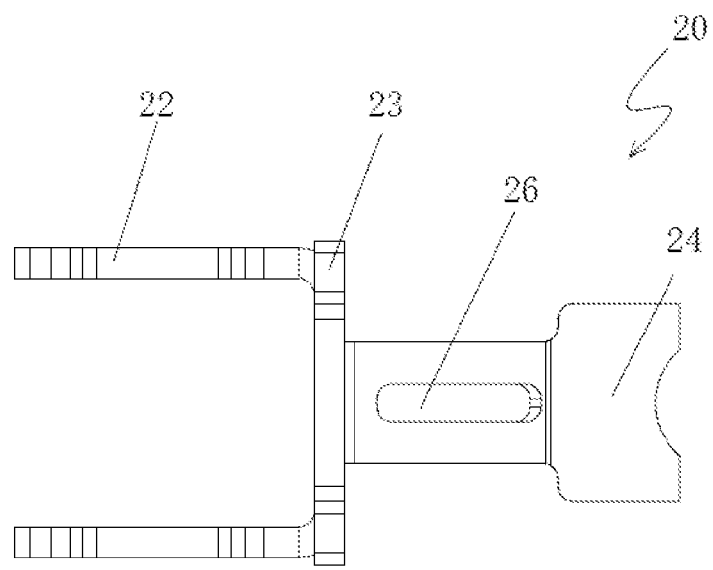
Figure 19:
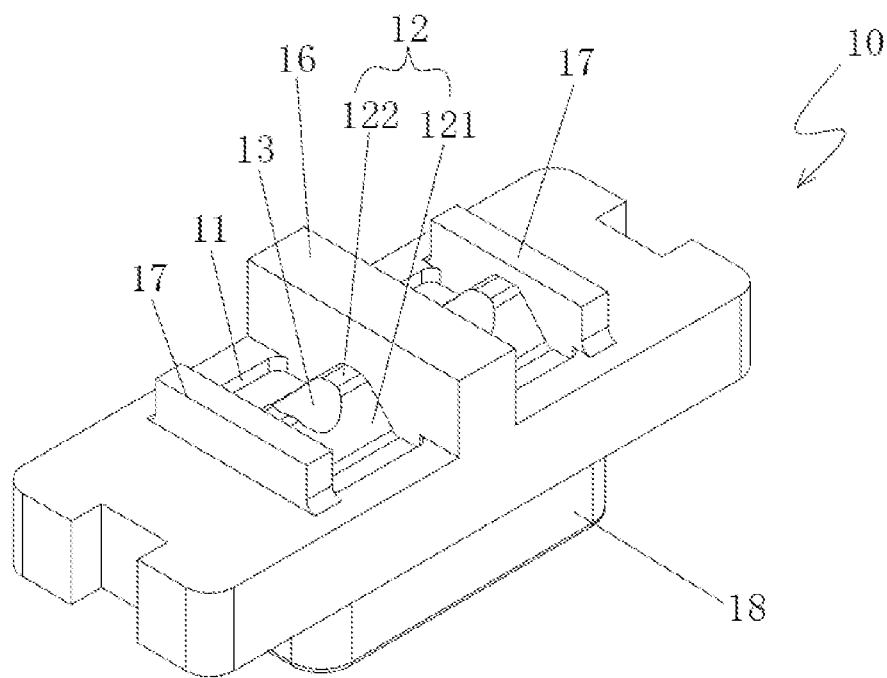
FIG. 19 and FIG. 20 are a top view and a bottom view of an insulated rubber core in embodiment 2.
Figure 20:
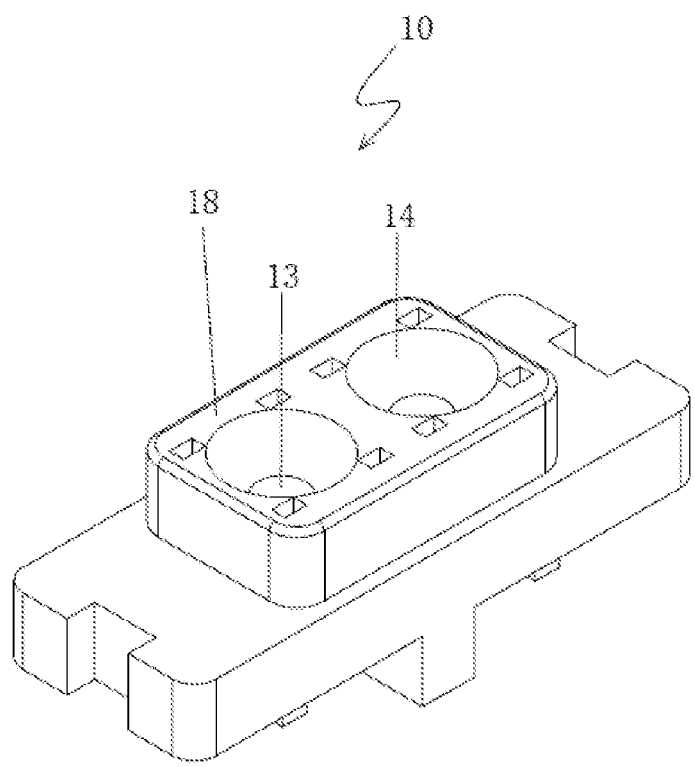
Figure 21:
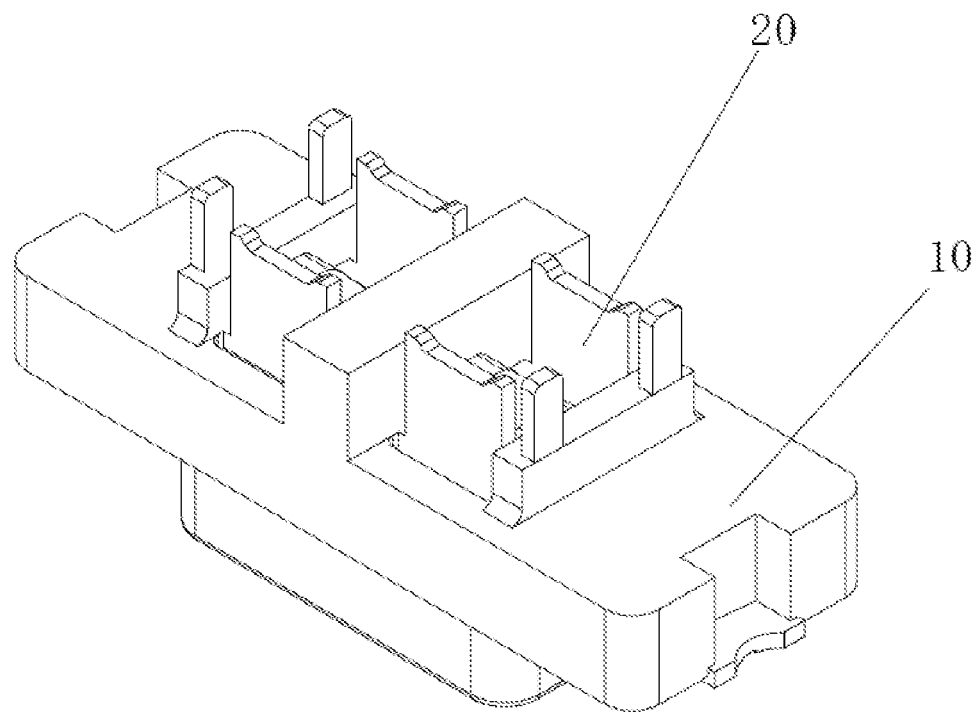
FIG. 21 is a view of a semi-finished connector (before the metal female terminals are bent) in embodiment 2.
Figure 22:
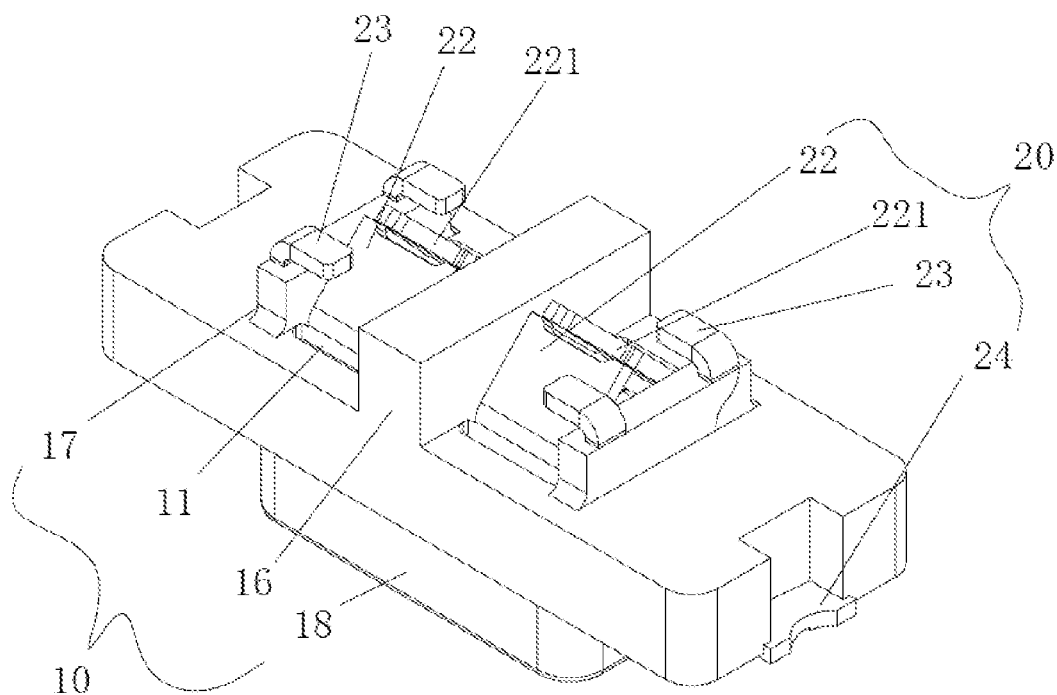
FIG. 22 is a top view of a finished connector (after the metal female terminals are bent) in embodiment 2.
Figure 23:
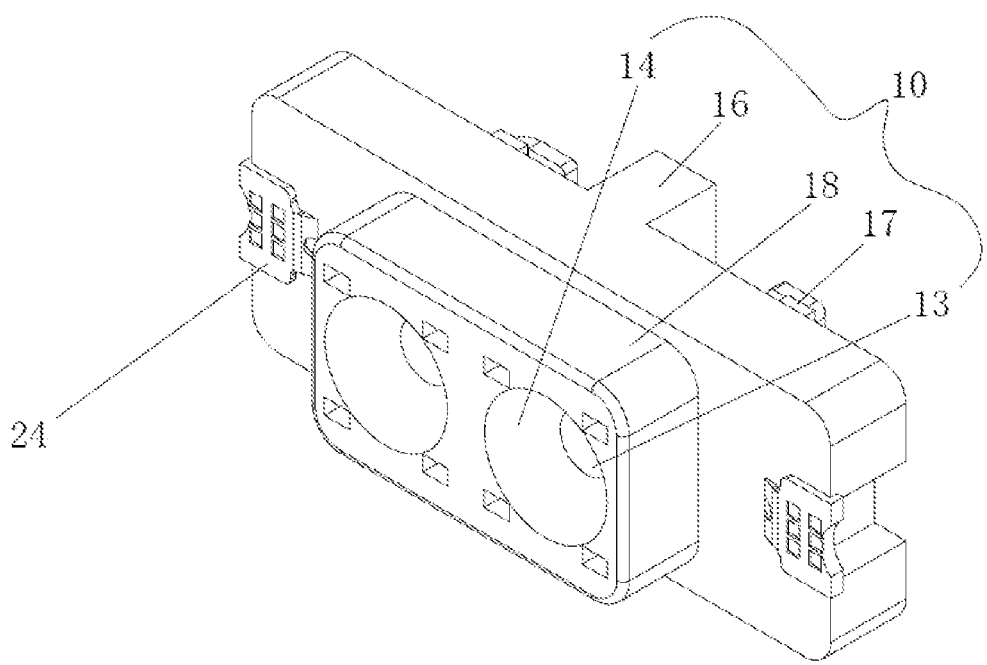
FIG. 23 is a bottom view of the finished connector in embodiment 2.
Figure 24:
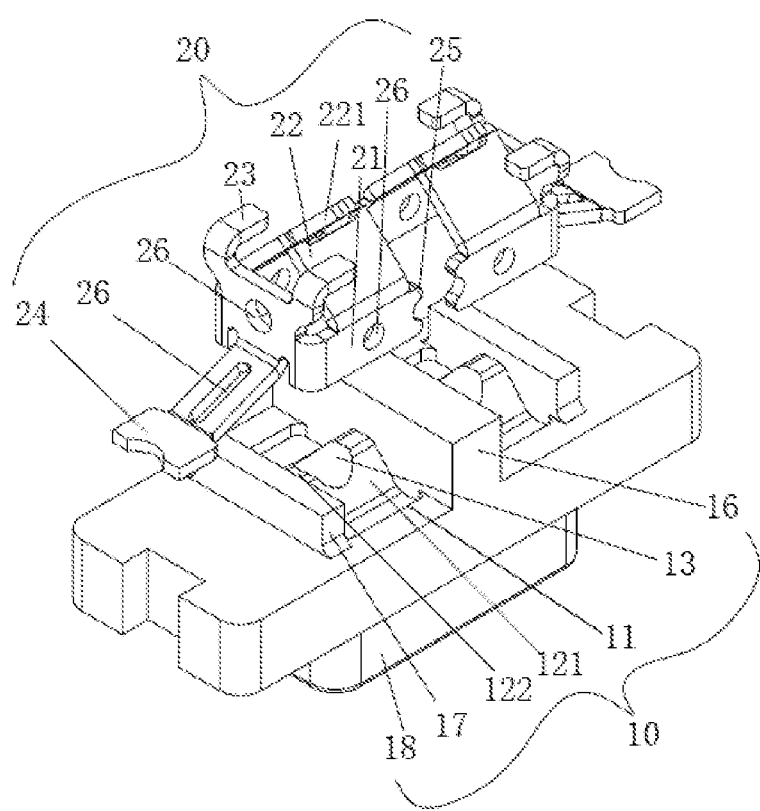
FIG. 24 is disassembled view of the metal female terminals and the insulated rubber core in embodiment 2.
Figure 25:
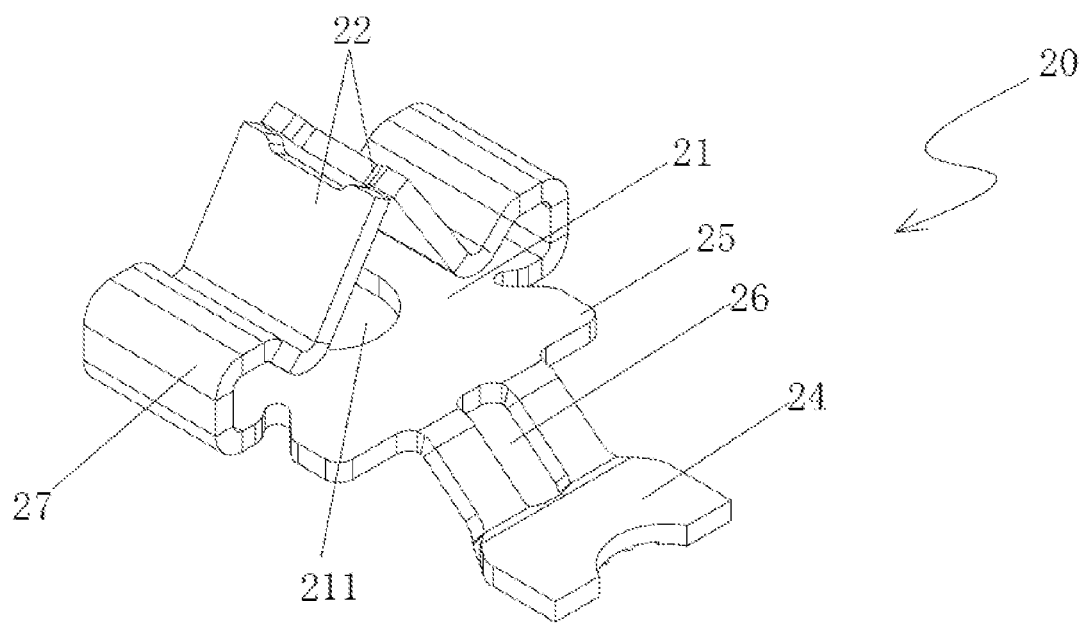
FIG. 25, FIG. 26 and FIG. 27 are a first perspective view, a second perspective view and a top view of a metal female terminal after bending in embodiment 3.
Figure 26:
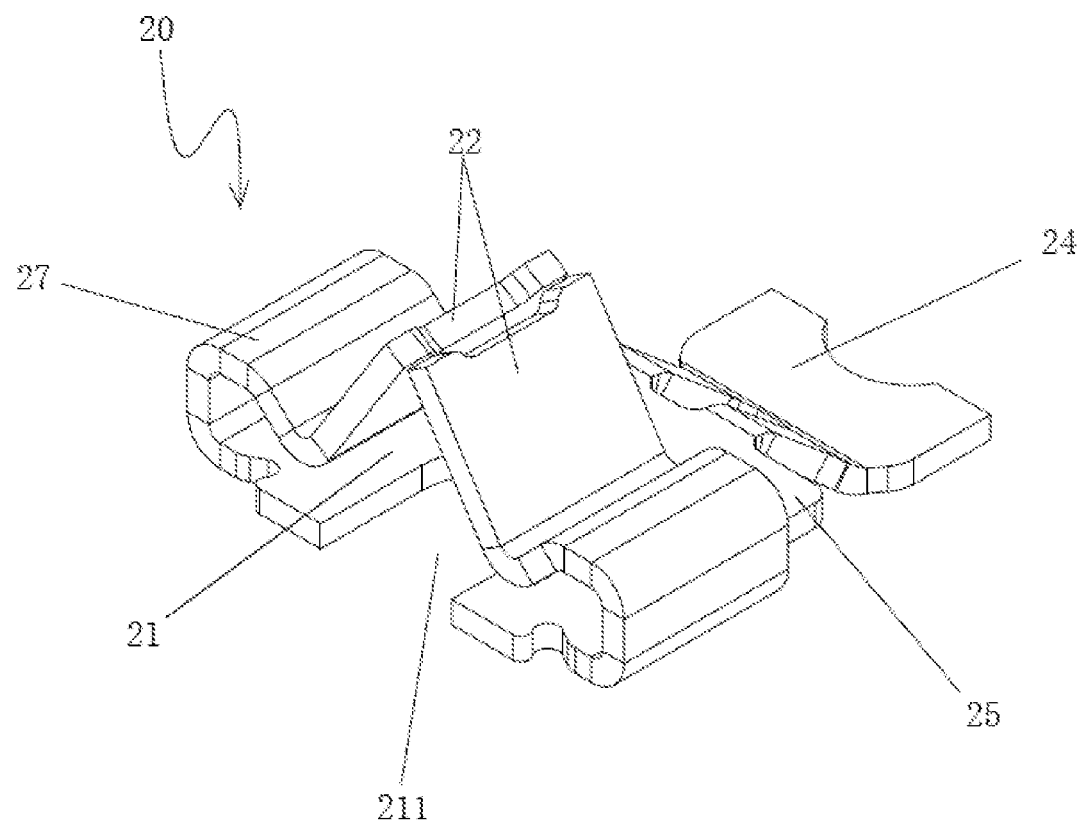
Figure 27:
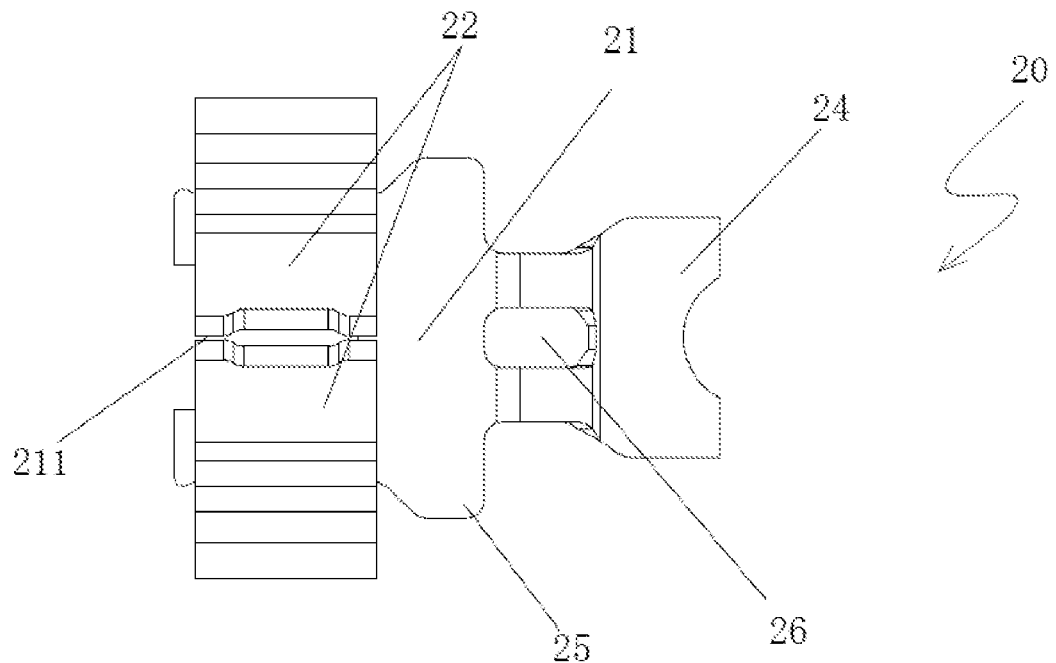
Figure 28:
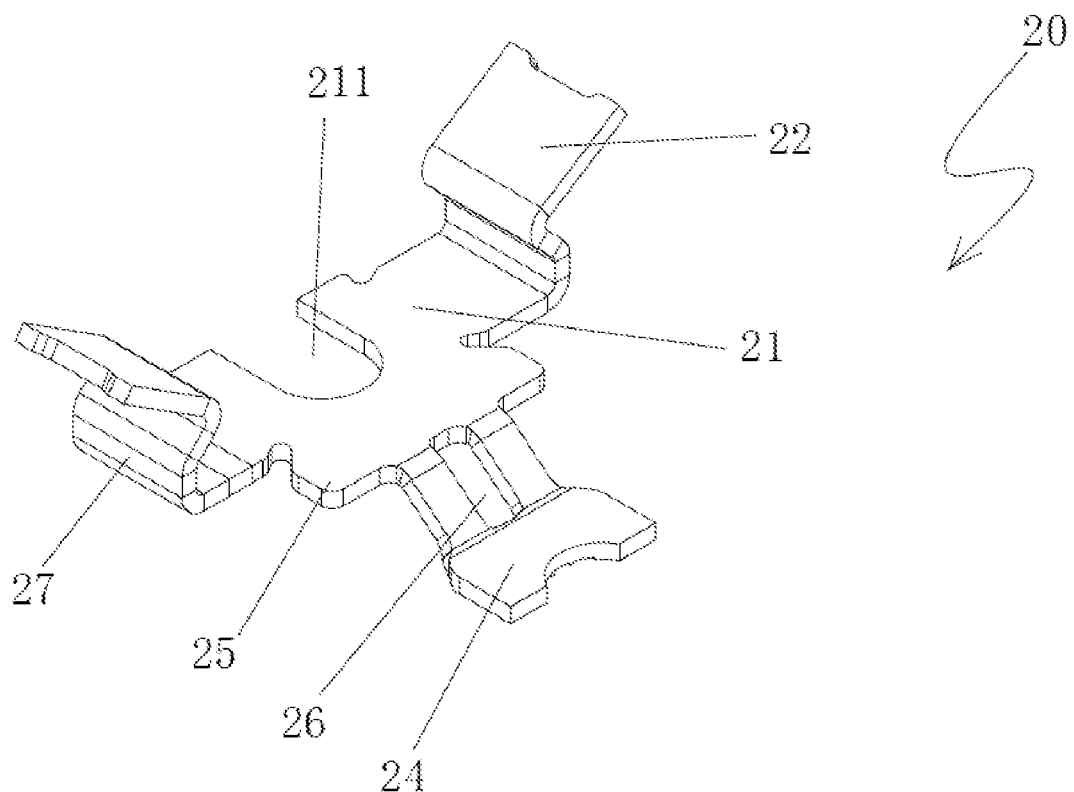
FIG. 28, FIG. 29 and FIG. 30 are a first perspective view, a second perspective view and a top view of the metal female terminal before bending in embodiment 3.
Figure 29:
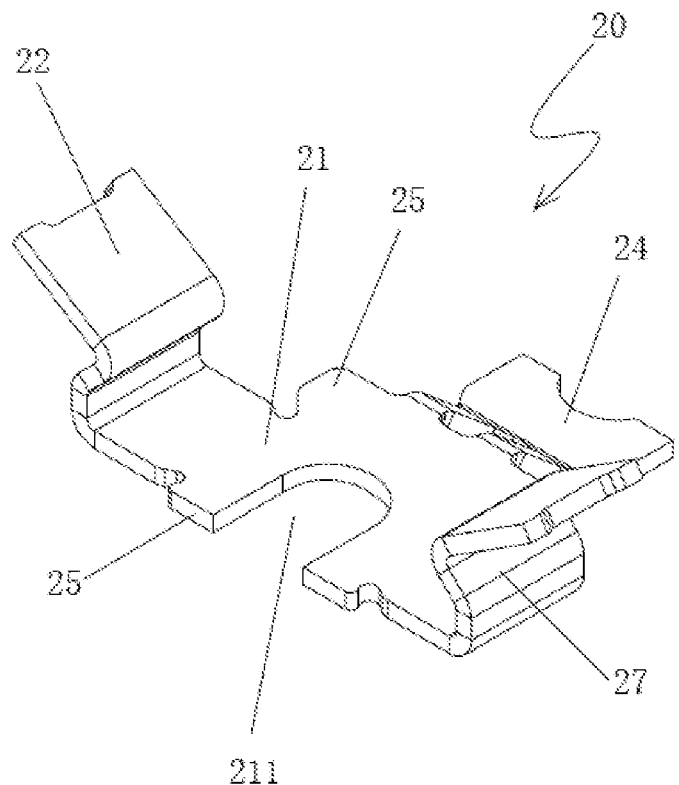
Figure 30:
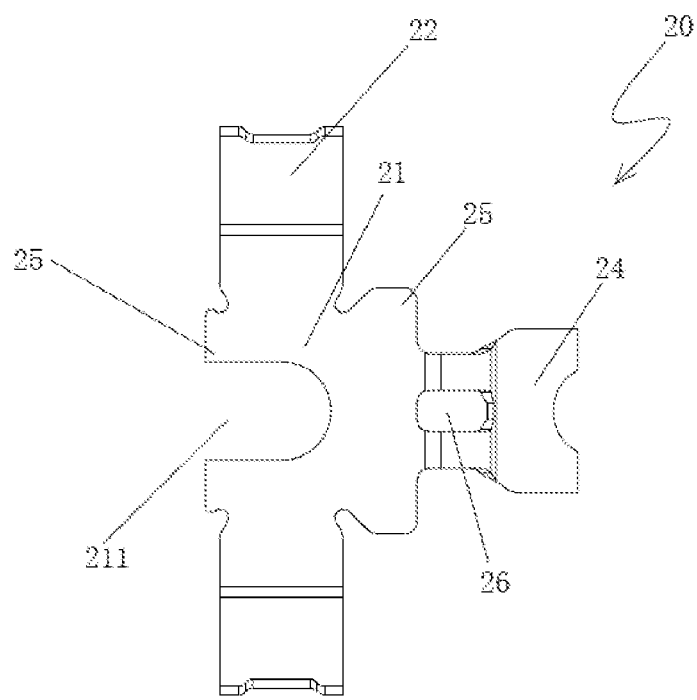
Figure 31:
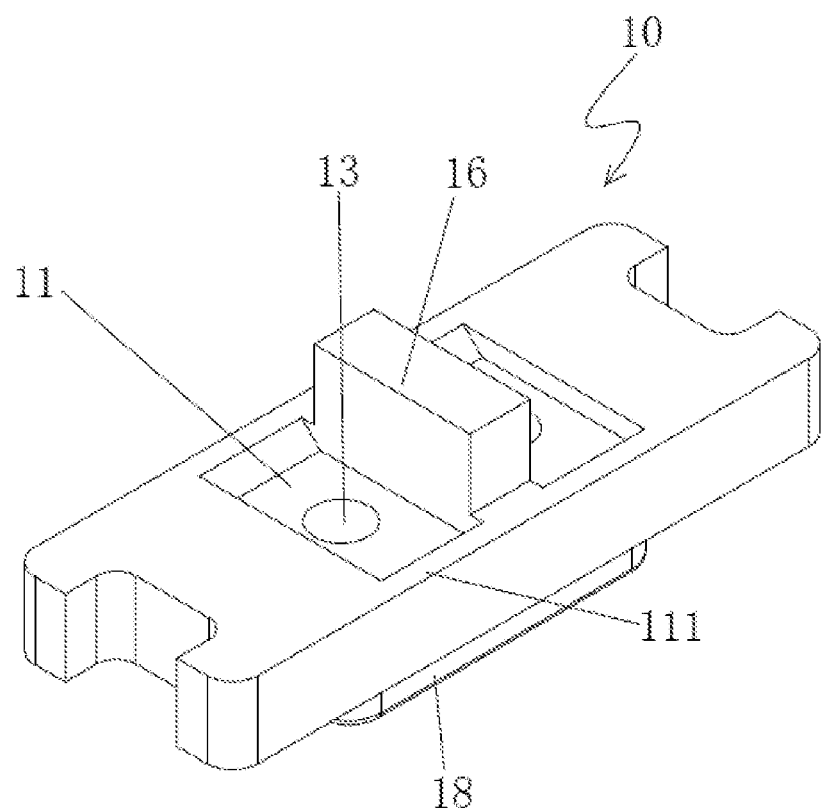
FIG. 31 and FIG. 32 are a top view and a bottom view of an insulted rubber core in embodiment 3.
Figure 32:
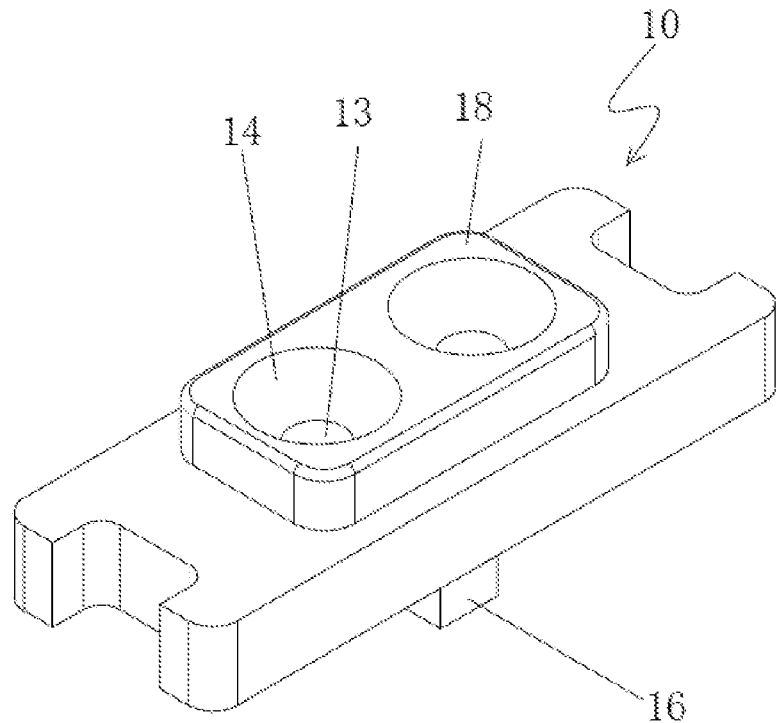
Figure 33:
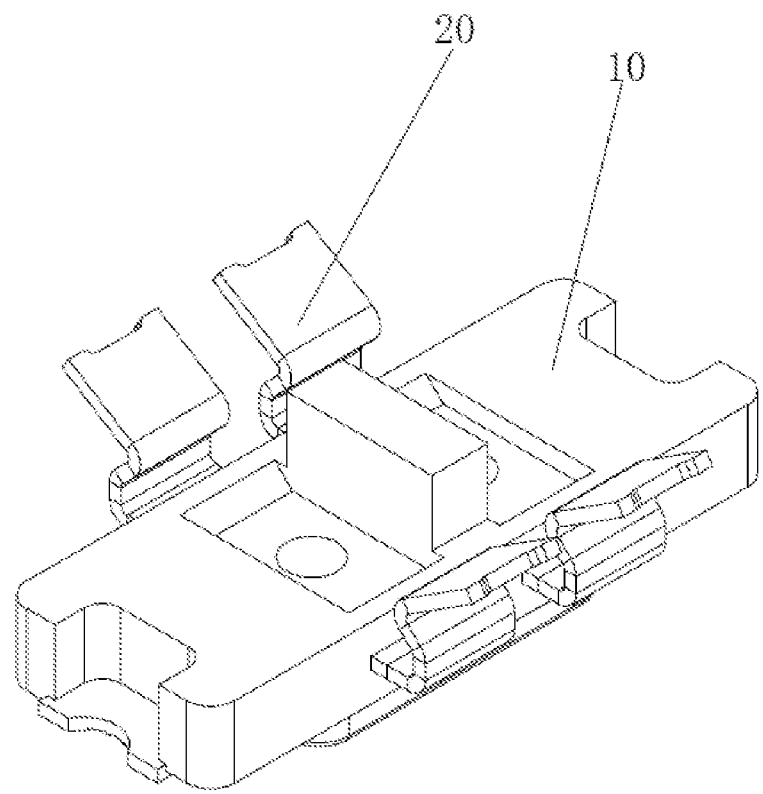
FIG. 33 is a view of a semi-finished connector (the metal female terminals are not bent) in embodiment 3.
Figure 34:
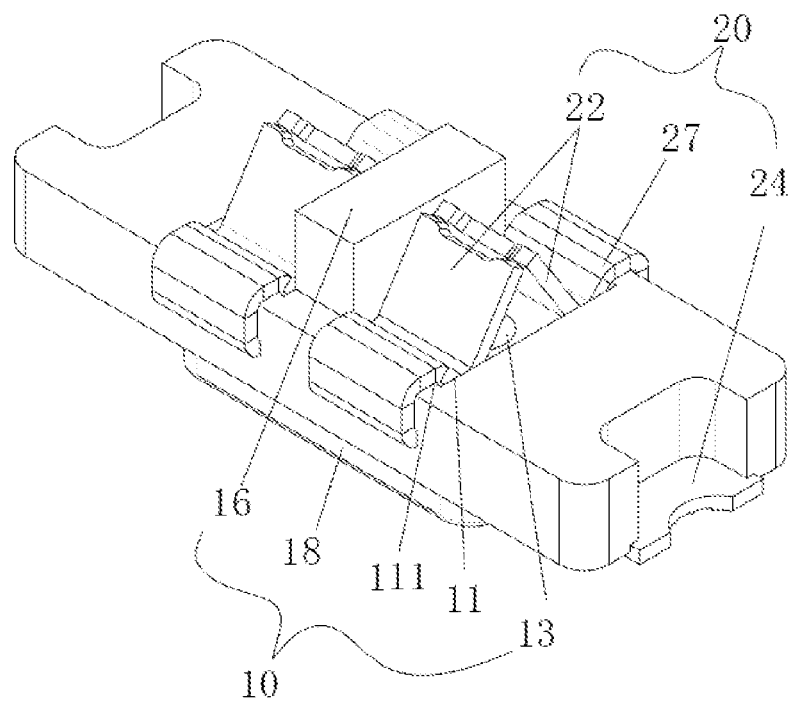
FIG. 34 is a top view of a finished connector (after the metal female terminals are bent) in embodiment 3.
Figure 35:
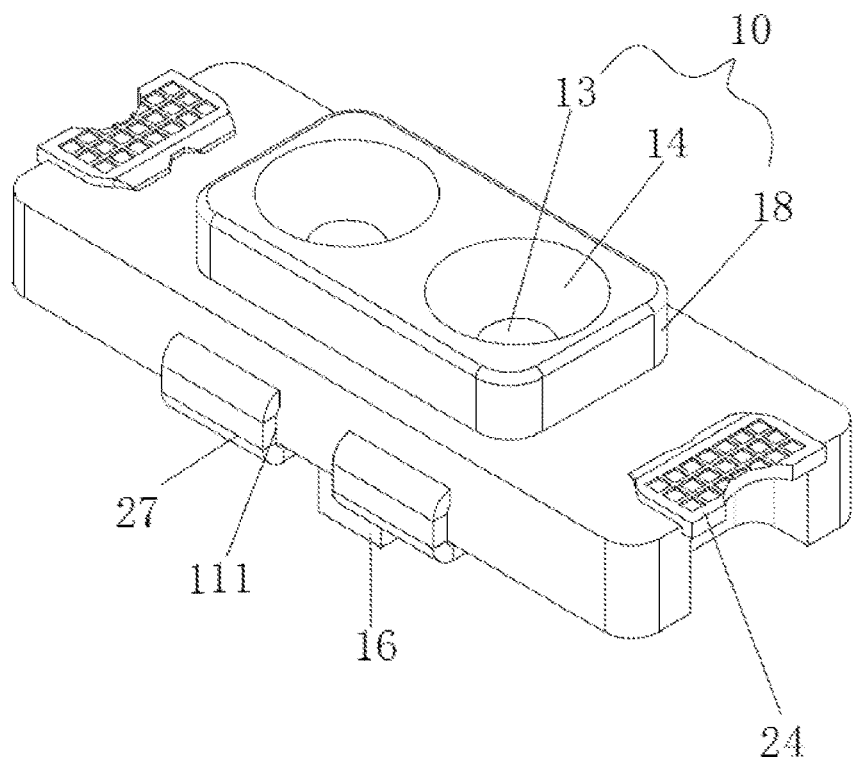
FIG. 35 is a bottom view of the finished product in embodiment 3.
Figure 36:
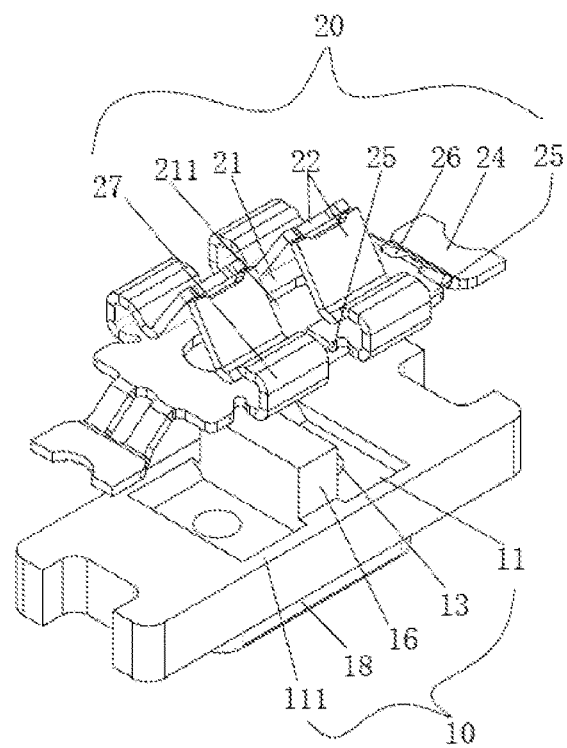
FIG. 36 is a disassembled view of the metal female terminals and the insulated rubber core in embodiment 3.

In order to assemble the insulated rubber core 10 on the metal female terminals 20 more firmly by injection molding, positioning holes 26 are formed in the metal female terminals 20. As shown in FIG. 13 of embodiment 2, positioning holes 26 are formed in the two horizontal edges and the vertical edge of the base 21, and a positioning hole 26 is also formed in a connecting section between the weld leg 24 and the base 21. Similarly, in order to assemble the insulated rubber core 10 on the metal female terminals 20 more firmly by injection molding, positioning hooks 25 are formed on the metal female terminals 20. As shown in FIG. 1 of embodiment 1 and FIG. 13 of embodiment 2, positioning hooks 25 are formed at ends of the two horizontal edges of the base 21, and a positioning hook 25 is also formed on the connecting section between the weld leg 24 and the base 21.

In order to facilitate installation and fixation of the electrical connector on a light source board, a boss 18 is further arranged at the bottom of the insulated rubber core 10 and is to be installed in an installation hole of the light source board.

The metal female terminals 20 are simple in structure and can be formed by sheet stamping.

As shown in FIGS. 25-36, in embodiment 3, the electrical connector comprises an insulated rubber core 10 and metal female terminals 20.

Each metal female terminal 20 is provided with a horizontal base 21, wherein two opposite edges of the base 21 extend upwards and incline relative to each other to form two enclosure parts 27 and a pair of elastic clamping pieces 22 allowing a male terminal to be inserted therebetween to realize electric connection; an insertion groove 211 corresponding to the elastic clamping pieces 22 is formed in the base 21, and the male terminal penetrates through the insertion groove 211 to be electrically connected with the elastic clamping pieces 22; and another edge of the base 21 extends outwards to form a weld leg 24. In order to facilitate formation and to realize easier assembling, the insertion groove 211 is in a U shape having an opening located on a side, opposite to the weld leg 24, of the base 21. Particularly, another edge of the base 21 inclines downwards and extends outwards to form the weld leg 24, and the weld leg 24 is not limited to the shape shown in the figures.

The insulated rubber core 10 is directly formed on the metal female terminals 20 by one-time injection molding. The bases 21 of the metal female terminals 20 are embedded in the insulated rubber core 10, and the two enclosure parts 27 of each metal female terminal 20 enclose two side faces of the insulated rubber core 10 from the outside. Cavities 11 are formed in the insulated rubber core 10, and the pair of elastic clamping pieces 22 of each metal female terminal 20 is received in one cavity 11 of the insulated rubber core 10. Through insertion holes 13 corresponding to the insertion grooves 211 of the metal female terminals 20 and clamping openings of the elastic clamping pieces 22 are formed in bottoms of the cavities 11. The male terminals penetrate through the insertion holes 13 to be matched with the elastic clamping pieces 22 to realize electric connection. Conical guide-in faces 14 are formed at bottoms of the insertion holes 13, so that the male terminals can smoothly penetrate through the insertion holes 13. The weld legs 24 stretch out of the insulated rubber core 10 so as to be welded to a light source board to realize electric connection.

In order to improve the clamping effect of the elastic clamping pieces 22 on the male terminals, two opposite edges of each base 21 vertically extend upwards, then horizontally and oppositely extend, are then bent downwards to form enclosure parts 27 and finally incline upwards to form a pair of elastic clamping pieces 22, and the enclosure parts 27 stretch out of the insulated rubber core 10 to enclose two side faces of the insulated rubber core 10 and then stretch across a cavity wall 111 of the corresponding cavity 11, so that the metal female terminals 20 and the insulated rubber core 10 are firmly combined.

According to the electrical connector, the insulated rubber core 10 is formed on the metal female terminals 20 by one-time injection molding, the bases 21 of the metal female terminals 20 are embedded in the insulated rubber core 10, and the two enclosure parts 27 of each metal female terminal 20 enclose two side faces of the insulated rubber core 10 from the outside, so that the metal female terminals 20 are firmly combined with the insulated rubber core 10 and are electrically connected with the outside (such as a light source board) via the weld legs 24, therefore, the metal female terminals 20 are firmly installed on the bases 21 and are prevented from getting loose, the metal female terminals 20 are prevented from moving during injection molding, the elastic clamping pieces 22 are accurately and firmly installed, the qualification rate is ensured, and the stability of electric connection is ensured.

In this embodiment, the insulated rubber core 10 is shaped like the Chinese character 'ri', is formed on the two metal female terminals 20 by one-time injection molding and is provided with two shallow square cavities 11, a partition wall 16 is formed between the two cavities 11 to prevent creepage, and the enclosure parts 27 of each metal female terminal 20 stretch out of the insulated rubber core 10 to enclose two side faces of the insulated rubber core 10 and then stretch across a cavity wall 111 of the corresponding cavity 11; and each cavity 11 receives the elastic clamping pieces 22 of one metal female terminal 20, and the weld legs 24 of the two metal female terminals 20 stretch out from two sides of the insulated rubber core 10.

To facilitate installation and fixation of the electrical connector on a light source board, a boss 18 is arranged at the bottom of the insulated rubber core 10 and is to be installed in an installation hole of the light source board.

The metal female terminals 20 are simple in structure and can be formed by sheet stamping. The metal female terminals 20 are further provided with positioning hooks 25 and positioning holes 26, and the positioning hooks 25 and the positioning holes 26 are used for preventing the metal female terminals 20 from moving during injection molding, so that the elastic clamping pieces 22 are firmly installed. Particularly, the positioning hooks 25 are formed on edges of the bases 21 of the metal female terminals 20, and the positioning holes 26 are formed in the bases 21 of the metal female terminals 20 and connecting sections between the bases 21 and the weld legs 24.

When the electrical connector is applied to an LED bulb, a driver board and a light source board are installed in the LED bulb, wherein the driver board is located below the light source board. The key of this application is that: the electrical connector is installed on the light source board, male terminals are installed on the driver board, and the light source board is electrically connected with the driver board through the cooperation between the male terminals and the electrical connector. The driver board supplies power to an LED light source (the LED bulb) via the male terminals, electrical connector and the light source board to realize illumination. By adoption of the electrical connector, the stability of electric connection is improved, and the LED bulb can work more stably and safely.

What is claimed is:

1. An insulated electrical connector formed by one-time injection molding, comprising:
   an insulated rubber core, and
   metal female terminals, wherein each said metal female terminal is provided with a base, each said base is in an n shape when looked at from above and has;
   two horizontal edges extending upwards and inclining relative to each other to form a pair of elastic clamping pieces allowing a male terminal to be inserted therebetween to realize electric connection, and
   a vertical edge has two ends extending upwards and bent inwards to form pressing blocks located on the elastic clamping pieces, and the vertical edge of each said base extends outwards to form a weld leg;
   the insulated rubber core is formed on the metal female terminals by one-time injection molding, the bases of the metal female terminals are embedded in the insulated rubber core, cavities are formed in the insulated rubber core, the elastic clamping pieces of the metal female terminals stretch out of bottoms of the cavities so as to be received in the cavities, through insertion holes corresponding to the elastic clamping pieces of the metal female terminals and allowing the male terminals to penetrate through are formed in the bottoms of the cavities, conical guide-in faces are formed at bottoms of the insertion holes and the weld legs stretch out of the insulated rubber core.

2. The insulated electrical connector formed by one-time injection molding according to claim 1, wherein the bottoms of the cavities of the insulated rubber core are arched upwards to form convex faces which are close to bottom faces of the elastic clamping pieces, each said convex face has two upward-tilting side faces and a smooth-transition middle top face, bottom faces of two edges of each said pair of elastic clamping pieces are close to the two upward-tilting side faces of the corresponding convex face, a clamping opening of each said pair of elastic clamping pieces directly faces the smooth-transition middle top face of the corresponding convex face, and the insertion holes allowing the male terminals to penetrate through are located in the smooth-transition middle top faces of the convex faces.

3. The insulated electrical connector formed by one-time injection molding according to claim 1, wherein the insulated rubber core is formed on the two metal female terminals by one-time injection molding and is provided with two deep square cavities, each said cavity receives the elastic clamping piece of the corresponding metal female terminal, and the weld legs of the two metal female terminals stretch out from two sides of the insulated rubber core.

4. The insulated electrical connector formed by one-time injection molding according to claim 3, wherein steps corresponding to the pressing blocks are formed in the cavities of the insulated rubber core, and the pressing blocks stretch out via the steps.

5. The insulated electrical connector formed by one-time injection molding according to claim 1, wherein a vertical edge of each said base extends upwards and outwards and is then bent in a Z shape to form the corresponding weld leg.

6. The insulated electrical connector formed by one-time injection molding according to claim 1, wherein the insulated rubber core is formed on the two metal female terminals by one-time injection molding and is provided with two shallow square cavities, a partition wall is formed between the two cavities, convex walls are formed on two sides of the two cavities, each said cavity receives the elastic clamping pieces of the corresponding metal female terminal, the pressing blocks of the metal female terminals stretch out via the convex walls, and the weld legs of the two metal female terminals stretch out from two sides of the insulated rubber core.

7. The insulated electrical connector formed by one-time injection molding according to claim 1, wherein a vertical edge of each said base extends downwards and outwards to form the corresponding weld leg.

8. The insulated electrical connector formed by one-time injection molding according to claim 1, wherein positioning holes or positioning hooks are formed on the metal female terminals.

9. The insulated electrical connector formed by one-time injection molding according to claim 1, wherein a boss is arranged at a bottom of the insulated rubber core and is to be installed in an installation hole of a light source board.

* * * * *